United States Patent [19]

Dubois et al.

[11] Patent Number: 4,612,407

[45] Date of Patent: Sep. 16, 1986

[54] ALIPHATIC AROMATIZATION WITH INTEMETALLIC GROUP VIII-IIIA, IVA CATALYST

[75] Inventors: Lawrence H. Dubois, Berkeley Heights; Ralph G. Nuzzo, Summit, both of N.J.

[73] Assignee: AT&T Laboratories, Murray Hill, N.J.

[21] Appl. No.: 823,149

[22] Filed: Jan. 29, 1986

Related U.S. Application Data

[60] Continuation of Ser. No. 611,129, May 17, 1984, abandoned, Division of Ser. No. 481,160, Apr. 1, 1983, Pat. No. 4,507,401.

[51] Int. Cl.$^4$ ...................... C07C 5/367; C07C 5/393
[52] U.S. Cl. ..................................... 585/434; 585/419
[58] Field of Search ................................ 585/434, 419

[56] References Cited

U.S. PATENT DOCUMENTS

| | | | |
|---|---|---|---|
| 3,790,473 | 2/1974 | Rausch | 585/419 |
| 3,801,498 | 4/1974 | Rausch | 585/434 |
| 3,825,612 | 7/1974 | Wilhelm | 585/434 |
| 3,932,548 | 1/1976 | Rausch | 208/138 |
| 3,939,220 | 2/1976 | Rausch | 208/138 |
| 3,980,726 | 9/1976 | Hayes | 208/138 |
| 4,032,586 | 6/1977 | Hayes | 585/419 |
| 4,032,587 | 6/1977 | Antos | 585/419 |
| 4,046,828 | 9/1977 | Pollitzer et al. | 585/419 |
| 4,072,602 | 2/1978 | Hayes | 208/138 |
| 4,087,352 | 5/1978 | Antos | 585/419 |
| 4,157,356 | 6/1979 | Bulford et al. | 585/415 |
| 4,175,031 | 11/1979 | Antos | 208/138 |
| 4,187,168 | 2/1980 | McVicker | 208/138 |
| 4,214,980 | 7/1980 | Le Page et al. | 585/419 |
| 4,229,320 | 10/1980 | Slaugh | 585/417 |
| 4,293,723 | 10/1981 | Slaugh | 585/415 |
| 4,384,154 | 5/1983 | Slaugh | 585/415 |
| 4,384,986 | 5/1983 | Lecloux et al. | 585/419 |

OTHER PUBLICATIONS

Cahn, *Physical Metallurgy*, North-Holland Publ., 1965, pp. 213-261.

*Primary Examiner*—John Doll
*Assistant Examiner*—Lance Johnson
*Attorney, Agent, or Firm*—Bruce S. Schneider

[57] ABSTRACT

Supported intermetallic compounds are produced by a two-step process. In the first step, a supported metal is formed, for example, by solvating a metallic salt such as nickel nitrate and applying it to a support medium. The treated support body is then heated in the presence of a reducing agent to produce elemental metal. The supported metal is then treated with a reactive organometallic or metal hydride compound to yield a supported intermetallic compound. For example, supported elemental nickel is treated with hexamethyldisilane to produce supported nickel silicide.

11 Claims, No Drawings

4,612,407

ALIPHATIC AROMATIZATION WITH INTEMETALLIC GROUP VIII–IIIA, IVA CATALYST

This application is a continuation of application Ser. No. 611,129, filed May 17, 1984, now abandoned which was a divisional application of Ser. No. 481,160, filed Apr. 1, 1983, now U.S. Pat. No. 4,507,401.

BACKGROUND OF THE INVENTION

1. Field of the Invention

This invention relates to catalysis and, in particular, to catalysis by compounds containing Group VIII metals.

2. Art Background

Metal alloys formed from metals such as platinum and rhenium, or nickel and palladium are employed as catalysts in a wide variety of commercially significant reactions. For example, these alloys are utilized for the reforming of hydrocarbons for gasoline. Production of these metal alloys is usually accomplished by treating a support such as a porous silica or alumina body with a solution of the appropriate metal salts or metal oxides and subsequently reducing these materials in the presence of hydrogen to form the alloy.

Other metal compositions also show catalytic activity for various applications. Presently, investigations concerning intermetallic compounds, e.g., compounds represented by the formula $A_xB_y$, where A and B are metallic atoms and x and y are integers or fractional values, similarly demonstrate catalytic activity. Intermetallic compounds are prepared initially in bulk from the elements corresponding to the atoms of the final product, by first heating the mixture to form a melt, and then cooling, thus producing the desired intermetallic compound. This bulk compound is then mechanically ground into particles which are used for catalysis.

In reforming processes many intermetallic catalysts yield relatively good conversion of aliphatic, e.g., heptane and cycloaliphatic compounds, such as cyclohexane, to the more desirable aromatic compounds, e.g., toluene and benzene. Despite this desirable performace, bulk intermetallic catalysts have certain limitations. For example, the surface area produced by mechanical procedures is typically less than 1 $m^2/gm$. The limited surface area generated by mechanical grinding correspondingly limits the efficacy of the catalyst. Additionally, in processes such as reforming, hydrogen is introduced to prevent the decomposition of the reactant aliphatic compound and the poisoning of the catalyst by carbon deposits resulting from this decomposition. However, the presence of hydrogen also favors the hydrogenolysis of aliphatic compounds such as cyclohexane and retards the preferable dehydrogenation of these compounds to aromatic compounds such as benzene. Yet, for many applications an enhanced degree of dehydrogenation relative to hydrogenolysis in the presence of hydrogen together with an enhanced conversion efficiency is certainly desirable.

SUMMARY OF THE INVENTION

A process has been found which allows the production of intermetallic catalytic compositions having large surface areas, e.g., surface areas comparable to that of highly dispersed supported metal alloy catalysts. (Dispersions greater than 10 percent and support surface areas greater than 10 $m^2/gm$ are obtained where dispersion is the number of surface atoms per atom of intermetallic composition.) Additionally, these supported intermetallic catalysts have quite useful catalytic properties, e.g., preferential catalysis of dehydrogenation rather than hydrogenolysis processes. The inventive catalysts are formed by first producing a supported Group VIII elemental metal by, for example, treating a support with a solution of a Group VIII metal salt. (A support is a body, e.g., a porous silica or alumina body having a large surface area, i.e., a surface area greater than 10 $m^2/gm$.) The treated support is then heated in the presence of a reducing agent to reduce the salt to the elemental metal.

The supported metal is treated with a reactive, volatile organometallic based compound or a corresponding volatile metal hydride. These compounds are chosen to contain a metal atom or atoms from the group including boron, aluminum, gallium, indium, silicon, germanium, and tin. The reaction of the Group VIII supported metal with the metal compounds produce intermetallic materials with desirable properties. For example, if supported nickel is reacted with silane, a nickel silicide is produced. Under suitable reaction conditions this supported nickel silicide advantageously induces essentially only dehydrogenation (rather than hydrogenolysis).

DETAILED DESCRIPTION

The inventive supported intermetallic catalysts, $A_xB_y$, are produced by a process which begins with the preparation of a supported Group VIII metal composition where the Group VIII metal, A, includes iron, cobalt, nickel, ruthenium, rhodium, palladium, osmium, iridium, platinum, or combinations of these metals. (The representative formulae $A_xB_y$ include not only single phase but also mixed solid phase compositions.) Many methods for producing a supported metal are well known in the art and each is useful in performing the inventive process. Additionally, the particular support material employed is not critical. Materials such as silica and alumina are extensively used as supports and are commercially available in forms which have relatively high surface area. It is generally desirable to use a support which has a surface area of at least 10 $m^2/gm$ preferably at least 100 $m^2/gm$.

In one embodiment of the invention, the supported Group VIII metal is produced by first treating the support with a solution of a Group VIII metal salt. The particular solvent employed is not critical, provided it does not introduce a significant level of undesirable impurities. For example, distilled water or organic solvents such as acetone and ethanol are quite useful. The particular Group VIII metal salt employed is also not critical and salts such as nitrates, acetates, and halides are generally available and are employable. (The salt anion is not critical to the formation of the intermetallic material since the salt is ultimately reduced to the metal.)

The amount of metal atoms deposited on the support per unit surface area depends on the concentration of the Group VIII metal salt solution. Generally, it is desirable to produce a support having 0.01 to 10 weight percent metal per weight of the support. The support is advantageously treated simply be immersing it in a suitable salt solution and then evaporating the solution to dryness. Typically, essentially all of the salt dissolved in the solution is deposited upon the support with only a negligible quantity being deposited on the vessel walls. Thus, a suitable volume and concentration of the salt solution is chosen to yield the desired quantity of salt deposited onto the support. Treatment time is not critical, and time periods in the range 1 hour to 1 day are sufficient to cause adequate contact with a large percentage of the available support surface area. After the support is treated with the solution, the solvent is removed, in one embodiment, by evaporation. For example, in the case of acetone, evaporation is easily induced at room temperature under relatively low vacuum. Similarly, the evaporation of water as a solvent is accomplished by heating under vacuum.

After the substrate has been treated, and the solvent has been removed, the salt remaining on the support is converted to the metal by reduction. A variety of reducing agents are employable. However, because of its relatively low cost compared to other reducing agents and because of its availability, molecular hydrogen is advantageously employed. Elevated temperatures generally in the range 50 to 600 degrees C. are employed in the reduction to the elemental metal with reducing agents such as hydrogen. (See, Thomson, Webs, Oliver and Boyd, *Heterogeneous Catalysis*, (Edinburgh, 1968) and G. C. Bond, *Catalysis by Metals*, (New York: Academic Press, 1962) for a description of such reduction procedures.)

The supported Group VIII metal need not be a single metal element. Mixtures of Group VIII metals are acceptable and are easily produced utilizing mixtures of the corresponding salts in solution. Additionally, relatively small amounts of non-Group VIII metals, i.e., amounts less than 5 weight percent of the total metal employed, are usable with the Group VIII metals. These non-Group VIII metals are easily introduced through an appropriate salt or oxide.

After the supported Group VIII metal is prepared, it is treated with a reactive composition, e.g., an organometallic composition or metal hydride, which is volatile—has a vapor pressure of at least 0.01 Torr at the reaction temperature which is to be employed. (A metal hydride is a compound having at least one metal to hydrogen bond.) This reactive composition should contain atom(s), B, which include boron, aluminum, gallium, indium, silicon, germanium, tin, or combinations of these atoms. It is possible to form a large variety of intermetallic compounds utilizing supported Group VIII metal(s), A, and a reactive gas containing metal(s), B. Not all combinations of A and B necessarily form supported intermetallic compositions. However, if an intermetallic composition of the form $A_xB_y$ exists in bulk, then a supported intermetallic of the form $A_zB_w$ (where z and w are not necessarily equivalent to x and y, respectively) is producible by forming the supported Group VIII metal(s) and then reacting it with a gas or gases having the desired Group IIIa or Group IVa atom(s). (The existence of a particular intermetallic bulk compound is easily determined by consulting the extensive phase diagrams published for combinations of Group VIII metals with Group IIIa and/or Group IVa elements. See, for example, W. G. Moffatt, *The Handbook of Binary Phase Diagrams*, General Electric Company, Schenectady, N.Y., 1978.)

To ensure that a desired intermetallic compound is formed, the reactive compound should satisfy certain criteria. First the reactive compound should be volatile, i.e., have a vapor pressure (at the reaction temperature employed to produce the intermetallic compound) of greater than 0.01 Torr, preferably greater than 0.1 Torr. If a compund with a lower volatility is employed, it is difficult to supply sufficient gas for reaction with the supported Group VIII metal. Generally, for adequate reaction to occur, partial pressures above 0.01 Torr, preferably above 0.1 Torr, are utilized.

The reactive gas should react sufficiently with the supported metal so that sufficient intermetallic composition is formed to yield catalytic activity which differs from the Group VIII metal. Generally very small amounts of intermetallic composition do afford useful catalytic activity. However, it is preferred, although not essential, to produce at least on an average a monolayer of intermetallic material on the surface of the initially supported Group VIII metal. (The reaction need not occur through the full thickness of the supported metal.) The reactivity of the gas depends not only on its specific composition but also on the temperature employed for reaction, the concentration of the reactive gas, and the presence of other agents, such as hydrogen, in the reaction stream. Gases with relatively high reactivity are easily obtainable for boron, aluminum, silicon, germanium, gallium, indium, and tin. For example, silanes, disilanes (such as alkyl disilanes), digermanes (such as alkyl digermanes), boranes, tetramethyltin, organoaluminum compounds (such as triethylaluminum), trimethylindium, and trimethylgallium are employable. For gases which upon reaction liberate carbon containing entities, e.g., methyl groups from hexamethyldigermane, certain precautions should be taken. In particular, a reducing gas should be present to prevent the formation of carbonaceous deposits on the catalyst body. Typically, reducing agent partial pressures, e.g., hydrogen pressures greater than 1 Torr, are suitable. In a preferred embodiment, a gas having a metal-metal or metal-hydrogen bond, such as silane or disilane, is employed. These bonds are readily cleaved on the supported metal surface resulting in a rapid reaction between the reactive metal and the supported metal. A control sample is easily utilized to determine an appropriate temperature, pressure, and reaction time for a given reactive gas to yield the desired intermetallic composition. Generally, temperatures in the range 50 to 600 degrees C. employed in conjunction with typical partial pressures greater than 0.01 Torr, preferably greater than 0.1 Torr, yield suitable results. (Although the discussion has dealt with the use of one reactive gas, combinations of intermetallic compounds or higher intermetallic compounds, e.g., ternaries, are producible if the supported metal(s) are reacted with a mixture of gases.)

The reaction of the gas with the supported metal is performed in conventional equipment. In one embodiment, the supported metal is placed in a quartz tube and a gas flow is established utilizing a gas flow controller. The particular conditions employed to yield a specific composition of intermetallic compound is easily determined by utilizing a control sample. (The composition of the intermetallic compound produced is easily probed utilizing conventional analytical techniques such ESCA, X-ray fluorescence and quantitative elemental analysis.)

The following examples are illustrative of the subject invention.

EXAMPLE 1

A solution of nickel nitrate hexahydrate (99.99 percent pure) was prepared in methanol so that a concentration of 0.98 gm in 80 ml of solution was obtained.

Approximately 1.83 gm of fine alumina powder (300 m²/gm) was added to the methanol solution. The solution with the added alumina was agitated mechanically overnight. The solvent was removed utilizing reduced pressure.

A quartz tube having an outside diameter of approximately 6 mm and an inside diameter of 4 mm was prepared by stoppering one of its ends with a plug of quartz wool. Approximately 0.25 gm of the treated alumina attained after evaporation was placed in the tube and the remaining end stoppered also with a plug of quartz wool. The tube was inserted into a tube furnace and placed between a source of gas and a gas chromatograph. The connection to the gas chromatograph was made at a point between the injection port and the chromatographic column.

To reduce the treated support, a 20 sccm flow of 50 percent hydrogen/50 percent helium by volume was established. The flow was continued for approximately 20 minutes to purge the system. The furnace was then heated to a temperature of approximately 600 degrees C. and maintained at this temperature for approximately 20 hours.

To determine the catalytic activity of the supported metal, the sample was cooled to and maintained at 300 degrees C. Several 2 ml aliquots of cyclohexane were then passed over the sample. The product resulting from catalysis was monitored utilizing the gas chromatograph and the ratio of hydrogenolysis to dehydrogenation product was measured as a function of hydrogen partial pressure. (This measurement was accomplished by varying the percentage of hydrogen in the 20 sccm hydrogen/helium flow.) The results are shown in the Table.

The 20 sccm flow was re-established to have a 50 percent hydrogen/50 percent helium by volume composition. Three pulses each containing 5 µl of hexamethyldisilane were then introduced with a 5 minute interval between pulses. The catalytic activity of the resulting intermetallic material was tested in the same manner described for the testing of the single supported metal. The results are shown in the Table. Since a relatively small amount of hexamethyldisilane was used, only a thin layer of intermetallic material was formed on the nickel surface. Increased temperature (increases to 600 degrees C.) caused interdiffusion of the silicon and, therefore, reduced the conversion selectivity of the catalyst. The results are shown in the Table. Retreatment with hexamethyldisilane restored the selectivity of the catalysts. The retreated material, additionally, had higher thermal stability since the presence of previously interdiffused silicon retarded the interdiffusion of the newly introduced silicon.

EXAMPLE 2

The same procedure was followed as described in Example 1 except a powdered silica support was employed. The results obtained are shown in the Table.

EXAMPLE 3

The same procedure as described in Example 2 was performed except silane rather than hexamethyldisilane was utilized. This silane was introduced by first establishing a 20 sccm flow of helium in place of the helium/hydrogen flow. Over a 15 minute period, 50 ml of a mixture of 30 percent silane in argon at one atmosphere was introduced, linearly with time, into the helium flow. The results obtained are shown in the Table. The selectivity of the catalysts as compared to the results in Example 1 showed very little temperature cycling variation. This can be explained since initially a larger amount of silicon is introduced and thus interdiffusion is immediately retarded.

EXAMPLE 4

The procedure of Example 1 was followed except hexamethyldigermane was employed rather than hexamethyldisilane. The conversion efficiency obtained is shown in the Table. The sample was then heated to 600 degrees C. for about a half-hour and cooled once again to 300 degrees C. The resulting composition had a much higher reactivity than the originally obtained intermetallic material. The selectivity, however, was unaltered. Again this is believed to occur through interdiffusion of germanium yielding a less germanium rich surface phase which is apparently, more active. The results are shown in the Table. Additionally, this newly established surface phase was thermally stable and could be cycled to 600 degrees C. without noticeably changing the selectivity and reactivity.

EXAMPLE 5

The procedure of Example 1 was followed except borane triethylamine rather than hexamethyldisilane was introduced. The selectivity of the resulting intermetallic material is shown in the Table.

EXAMPLE 6

The procedure of Example 1 was followed except triethylaluminum was introduced rather than hexamethyldisilane. The results obtained are shown in the Table.

EXAMPLE 7

A supported platinum material was prepared in the same manner that the supported nickel material of Example 1 was prepared with the exception that the solution was a 30 ml ether solution containing 0.17 gm of dimethyl(1,5-cyclooctadiene)platinum(II) which was deposited on 0.90 gm of the support. The platinum material was then reduced as described in Example 1 except the reduction was accomplished at 150 degrees C. The reactivity was checked as described in Example 1 and then an intermetallic material was formed also as described in Example 1 utilizing either hexamethyldisilane or hexamethyldigermane. The catalytic activity effect of the silicide and germanide catalyst for conversion of heptane to heptene and to toluene was determined by introducing successive 2 µl pulses of heptane and monitoring the conversion as a function of hydrogen concentration. An increase in the amount of heptene formed was observed.

EXAMPLE 8

The procedure of Example 1 was followed except a supported rhodium material was initially formed. This material was produced utilizing a methanolic solution of rhodium trichloride trihydrate. The solution was prepared so that 0.51 gm of the rhodium salt was present in 80 ml of the solution. The catalytic activity of the supported rhodium material is shown in the Table. The corresponding germanide material was produced as described in Example 4 utilizing hexamethyldigermane. The selectivity of this intermetallic compound is shown in the Table.

TABLE

| Example Number | Initial Metal | Catalyst Support | Treatment | % Total Hydrocarbons | | |
|---|---|---|---|---|---|---|
| | | | | Cyclohexane | Benzene | Hydrogenolysis[a] Products |
| 1 | Ni | alumina | untreated | 54 (68)[b] | 19 (14) | 26 (18) |
| 1 | Ni | alumina | HMDS* | 54 (50)[c] | 46 (20) | 0 (29) |
| 2 | Ni | silica | untreated | 59 (76)[b] | 15 (12) | 26 (12) |
| 2 | Ni | silica | HMDS | 36 | 64 | 0 |
| 3 | Ni | silica | silane | 96 (97)[c] | 4 (3) | 0 (0) |
| 4 | Ni | alumina | HMDG** | 82 (38)[c] | 18 (62) | 0 (0) |
| 5 | Ni | alumina | BTA*** | 99 | 1 | 0 |
| 6 | Ni | alumina | TEAL**** | 97 | 3 | 0 |
| 8 | Rh | alumina | untreated | 32 | 36 | 32 |
| 8 | Rh | alumina | HMDG | 53 (39)[c] | 47 (44) | 0 (17) |

[a] predominantly n-hexane
[b] temperature cycled to 1000 degrees C. under 10 percent $H_2$ in He
[c] temperature cycled to 600 degrees C. under 10 percent $H_2$ in He
*HMDS = hexamethyldisilane
**HMDG = hexamethyldigermane
***BTA = borane triethylamine
****TEAL = triethylaluminum

What is claimed is:

1. A catalytic process comprising the steps of contacting an aliphatic organic compound with an intermetallic catalyst to produce an aromatic compound characterized in that said intermetallic catalyst comprises at least two metals bound by intermetallic chemical bonds wherein said intermetallic catalyst is produced by the process comprising the steps of forming a Group VIII containing metal material on a supporting substrate and reacting said metal material with a reactant comprising a metal containing substance chosen from the group consisting of metal hydrides and organometallic materials where said reactant contains at least one member chosen from the group consisting of silicon, germanium, aluminum, boron, gallium, indium, and tin.

2. The process of claim 1 wherein said metal hydride is chosen from the group consisting of silanes and germanes.

3. The process of claim 1 wherein said organometallic material is chosen from the group consisting of disilanes and digermanes.

4. The process of claim 3 wherein said disilanes comprise lower alkyl disilanes.

5. The process of claim 4 wherein said disilanes comprise hexamethyldisilane.

6. The process of claim 4 wherein said Group VIII containing material comprises a member chosen from the group consisting of iron, cobalt, nickel, ruthenium, rhodium, palladium, osmium, iridium, and platinum.

7. The process of claim 3 wherein said digermanes comprise lower alkyl digermanes.

8. The process of claim 7 wherein said digermanes comprise hexamethyldigermane.

9. The process of claim 8 wherein said Group VIII containing material comprises nickel.

10. The process of claim 1 where said supporting body comprises a member chosen from the group consisting of silica and alumina.

11. The process of claim 1 wherein said supporting body has a surface area of at least 10 $m^2$/gm.

* * * * *

UNITED STATES PATENT AND TRADEMARK OFFICE
CERTIFICATE OF CORRECTION

PATENT NO.   : 4,612,407

DATED        : September 16, 1986

INVENTOR(S)  : Lawrence H. Dubois and Ralph G. Nuzzo

It is certified that error appears in the above-identified patent and that said Letters Patent is hereby corrected as shown below:

In the title, page 1, line 2, "INTEMETALLIC" should read --INTERMETALLIC--. Column 7, line 39, "tin." should read --tin so as to form said intermediate chemical bonds.--.
should read --The process of claim 4 where Signed and Sealed this Twenty-fifth Day of August, 1987

Attest:

DONALD J. QUIGG

Attesting Officer      Commissioner of Patents and Trademarks